(12) United States Patent
Bouvier

(10) Patent No.: US 8,190,839 B2
(45) Date of Patent: *May 29, 2012

(54) USING DOMAINS FOR PHYSICAL ADDRESS MANAGEMENT IN A MULTIPROCESSOR SYSTEM

(75) Inventor: Daniel L. Bouvier, Austin, TX (US)

(73) Assignee: Applied Micro Circuits Corporation, San Diego, CA (US)

( * ) Notice: Subject to any disclaimer, the term of this patent is extended or adjusted under 35 U.S.C. 154(b) by 612 days.

This patent is subject to a terminal disclaimer.

(21) Appl. No.: 12/402,345

(22) Filed: Mar. 11, 2009

(65) Prior Publication Data

US 2010/0235598 A1    Sep. 16, 2010

(51) Int. Cl.
*G06F 12/08* (2006.01)
*G11C 8/00* (2006.01)

(52) U.S. Cl. ............... 711/163; 711/3; 711/6; 711/124; 711/206; 711/E12.091; 711/129; 711/130; 711/E12.001; 718/1

(58) Field of Classification Search .................. None
See application file for complete search history.

(56) References Cited

U.S. PATENT DOCUMENTS

| | | | |
|---|---|---|---|
| 2005/0188173 A1* | 8/2005 | Hasbun et al. | 711/203 |
| 2005/0273571 A1* | 12/2005 | Lyon et al. | 711/203 |
| 2008/0133834 A1* | 6/2008 | Gaither et al. | 711/118 |
| 2008/0222338 A1* | 9/2008 | Balasubramanian et al. | 710/306 |
| 2008/0244507 A1* | 10/2008 | Hodson et al. | 717/106 |
| 2008/0244599 A1* | 10/2008 | Hodson et al. | 718/104 |
| 2009/0113110 A1* | 4/2009 | Chen et al. | 711/6 |

* cited by examiner

*Primary Examiner* — Jasmine Song
*Assistant Examiner* — Daniel Bernard
(74) *Attorney, Agent, or Firm* — Law Office of Gerald Maliszewski; Gerald Maliszewski

(57) ABSTRACT

A multi-processor computer system is provided for managing physical memory domains. The system includes at least one processor having an address interface for sending a memory access message, which includes an address in physical memory and a domain identification (ID). The system also includes a physical memory portioned into a plurality of domains, where each domain includes a plurality of physical addresses. A domain mapping unit (DMU) has an interface to accept the memory access message from the processor. The DMU uses the domain ID to access a permission list, cross-reference the domain ID to a domain including addresses in physical memory, and grant the processor access to the address in response to the address being located in the domain.

17 Claims, 6 Drawing Sheets

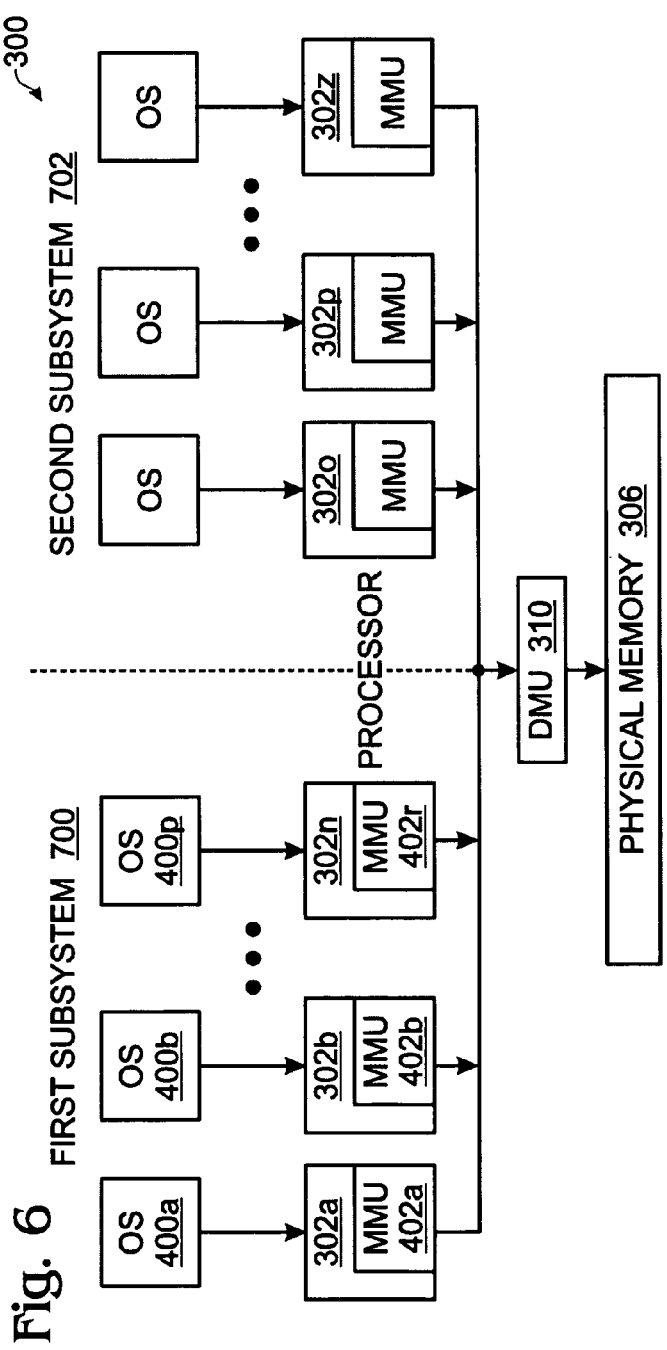

USING DOMAINS FOR PHYSICAL ADDRESS MANAGEMENT IN A MULTIPROCESSOR SYSTEM

BACKGROUND OF THE INVENTION

1. Field of the Invention

This invention generally relates to computer memory management and, more particularly, to a means for managing physical memory addresses in a system using multiple processors.

2. Description of the Related Art

Physical memory, as used herein, is the actual memory device(s) (DRAM, SRAM, FLASH, etc.) where data is stored. In processing, two types of information are generally stored in this memory—data and instructions. Data is the working set of constants and variables that software acts upon. Instructions are the list of commands or operations that are to be carried out on the data. Access to the memory is done through an address. Each location in memory has a unique address. The address of the actual physical devices is referred to as the physical address, or sometimes, real address.

In the early days of microprocessors, the address generated by software (SW) to access a memory location, was always a physical address. The working area that contained both the instructions and the data was called the working set. In the early days one, and only one, program would execute at a time on the computer, so operations were simple. Later, the notion of operating systems and applications was introduced. This meant that more than one SW program was resident on the computer and the processor could switch back and forth between these programs. Since multiple programs had access to all of physical memory it was possible for a bug or mistake in one program to corrupt the working set of another program. For example, if a first program made a mistake with an address pointer calculation, the wrong address might be written, perhaps overwriting the instructions for a second program. When the second program sequentially stepped through its instruction list and landed on a corrupted instruction, the computer would crash.

To get around this problem, the notion of virtual memory addressing was introduced. Each application is given a virtual address space to work within. The memory management unit and address translation mechanism permit the virtual address space to be translated to the actual physical memory where the storage of data and instructions actually exists. Alternately stated, software executes in what is called virtual address space. Each application, as well as the operating system (OS), "live" in their own virtual address map. However, the processor must ultimately use physical addresses in memory. So, an association has to be made between the virtual address space and the physical address space. The OS does this association and makes assignments to the individual applications using a memory allocation software routine.

When the system first boots, the OS builds an overall physical address map of the system. Memory is mapped in chunks called pages. A page table is built in memory by the OS with entries for each page called page table entries (PTE). Each page table entry includes the virtual page number, the associated physical page number, and any additional attribute bits related to the virtual or physical address. For example, each virtual address also includes the a Process Number associating a particular application with its physical address space.

A programmer writes their program with a specific address map in mind for the data structures to be accessed. Physical address cannot be used in the program because the programmer cannot know in advance if the addresses they might select are available or being used by another program. The memory management unit acts as a translation mechanism between the virtual address space where the program is executing and the actual physical address space where the instructions and data actually reside. As an example, when both application A and application B want to write address 0x0001 4000, a translation might be made such that the actual physical location for A is 0x00F0 1000 and for B is 0x000C 1000. This assignment of virtual to physical address translation is made by the Operating System in what is called a memory allocation routine or MALLOC.

But, if more than one operating system is being used in the system, it becomes possible for a first OS to assign the same physical address space to a first SW application, as a second OS might assign to a second application. In this circumstance, a Hypervisor and Virtualization become necessary. Now, a second level of address management software must run on the microprocessor, which assigns virtual address spaces and associated physical address translations to the individual OSs. The current art for cross-referencing virtual and physical addresses requires adding "extra" bits to the virtual side of the address, essentially expanding the virtual address. This expansion of the virtual address requires running some additional code (e.g., the Hypervisor). The advantage of this approach is that multiple OSs can then coexist on the same processor core. However, this approach does require an additional software layer (Hypervisor) to be active to manage that assignment on the virtual side.

It is not possible to use a Hypervisor if the system is using multiple heterogeneous asymmetric processors. Symmetric multiprocessing (SMP) is a system of computer architecture where two or more identical processors are connected to a single shared main (physical) memory. Further, each processor participating in the SMP system must coordinate together to manage memory. SMP systems permit any processor to work on any task no matter where the data for that task is located in memory. SMP systems can move tasks between processors to balance the workload efficiently. Asymmetric multiprocessing (AMP) refers to a system whereby multiple processors independently run operating systems with no awareness of each other. In this case there is no memory management coordination between the operating systems. Heterogeneous processors in this context are processors that have different programming models especially where memory management is concerned. Given the incompatibilities in memory management mechanisms between processors in a heterogeneous asymmetric multiprocessor, it is generally not pragmatic to use a Hypervisor.

Modern general purpose Harvard architecture processors typically include a multi-level cache hierarchy. The cache memory subsystem aids in delivering of commonly used instructions or data to the execution unit with the lowest latency possible. The average access latency is a key component to the execution performance of a software application.

The access time of a cache is based on the physical constraints of the access time of the SRAM arrays and logic associated with the cache controller. A larger cache has a physically larger array and, thus, the access latency due to lookup overhead and wire delays increases. Therefore, a processor typically has a moderately small first level cache (L1) in order to provide the best trade off in access latency vs. cache hit ratios. Subsequently, a second level cache (L2) is responsible for reducing cache miss penalty by caching a larger portion of the working set. This is done by providing a much larger cache array size, and comes with a penalty of longer access latency.

FIG. 1 is a schematic diagram depicting a plurality of processors sharing an L2 cache and main memory (prior art). It is common for systems to have software partitioned into several processes or threads. Further, it is becoming more common to break a workload or set of processes or threads across multiple processors such as in a multicore processor. In such systems, the cache hierarchy is typically shared amongst threads running on a single processor core. Further, it is often common in multicore processors to share a common L2 cache. A shared cache provides two benefits—first, data structures are shared between processors residing in a common location, thus, reducing transfer overhead from one cache to another. Secondly, not all software threads can leverage a cache equally. Some threads benefit more from a larger cache because they have a larger working set than other threads. Given that the exact workload that a processor will run in the future is not known when a processor is designed, it is usual practice to provide as large a cache as economically and physically practical. For a multicore device, an independent cache hierarchy can be provided for each processor. This cache hierarchy comes at the cost of potentially great inefficiency with respect to the resulting size, power, and cost. Instead, a shared cache (e.g., L2) is used when practical.

Certain applications require deterministic behavior as part of their operating characteristics. For example, real-time or deadline based computing often found in embedded applications requires a certain amount of computation be completed within a predetermined time period. Given a cache shared by multiple concurrent software processes, and further by multiple processors, the access latency for a thread is not guaranteed to be consistent due to the varied interactions of the other threads.

One solution has been to allow software configurable partitioning of the shared cache based on each physical processor that is sharing the cache. Such partitioning is implemented as part of the cache allocation scheme of the cache controller. For a two-CPU system, software running on CPU A is allocated use of space A in the cache, while CPU B is allocated space B. Such partitioning is very coarse and does not allow for inter-processor behaviors, especially where larger numbers of cores exist. Further, it does not address the specific behaviors and needs of different software operating on the same processor core.

The reduction in performance and access determinism is primarily due to two factors—the first is cache line replacement. This is the case where two or more threads are concurrently sharing a common cache. As these threads interact with the cache they compete for the limited resource, thus, randomly replacing cache elements that the other is potentially using, now or in the near future. In this circumstance, a change of code in one thread may adversely impact the performance of another thread.

The second item that impacts cache access latency is blocking. Blocking is the condition whereby two processors are accessing a common cache tag in order to examine if the desired cache element is currently resident in the cache. Since coherency must be maintained, one and only one access to a particular cache address can occur at a time.

FIG. 2 is a schematic diagram of a multi-processor system using an L2 cache bank (prior art). Larger shared caches have deployed the notion of cache banks. A cache of dimension X can be partitioned into N banks each of dimension Y. The banks each cache a smaller portion of the overall address space. Partitioning the cache into banks enables concurrent access. Such partitioning can be done using a low-level address-interleave. Conceptually, software randomly accesses memory locations located across the banks, thus enabling more concurrent accesses and a net reduction in average access latency.

It would be advantageous if a mechanism existed that permitted a physical memory to be efficiently shared between processors.

It would be advantageous if the above-referenced mechanism could be enabled in hardware, without implementing an additional software layer such as a Hypervisor.

SUMMARY OF THE INVENTION

Disclosed herein is a means to enable combined subsystems on a multicore processor with configurable partitioning. For example, some cores might be dedicated to a symmetric multiprocessing (SMP) shared memory domain, while others may work in separate partitions as individual single core subsystems.

Accordingly, a multi-processor computer system is provided for managing physical memory domains. The system includes at least one processor having an address interface for sending a memory access message, which includes an address in physical memory and a domain identification (ID). The system also includes a physical memory portioned into a plurality of domains, where each domain includes a plurality of physical addresses. A domain mapping unit (DMU) has an interface to accept the memory access message from the processor. The DMU uses the domain ID to access a permission list, cross-reference the domain ID to a domain including addresses in physical memory, and grant the processor access to the address in response to the address being located in the domain. The DMU fails to grant access to the address if the permission list does not locate the address in a domain cross-referenced to the domain ID.

For example, the DMU accepts a first memory access message from a first processor, with a first address in physical memory and a first domain ID. Further, the DMU accepts a second memory access message from a second processor, with a second address in physical memory and a second domain ID. The DMU uses the first and second domain IDs to access the permission list, and grants access to the first and second addresses, in response to the permission list locating the first and second addresses in a shared domain cross-referenced to the first and second domain IDs.

In one aspect, the system includes a plurality of operating systems (OSs) enabled as computer readable code and a plurality of memory management units (MMUs). Each MMU includes a page table map of virtual memory addresses cross-referenced to addresses in the physical memory, and the domain ID associated with each address in physical memory. A plurality of processors is included, and each processor is associated with a corresponding OS and MMU. In this aspect, at least two of the processors are heterogeneous, in that they have different MMU algorithms for associating virtual addresses to addresses in physical memory. However, the DMU permits the physical memory to be accessed, without conflict, by the heterogeneous processors, as long as the addresses in the memory access message match domains to which the domain IDs are cross-referenced.

Additional details of the above-described system, and a method for managing physical memory domains in a multi-processor computer system, are provided in more detail below.

BRIEF DESCRIPTION OF THE DRAWINGS

FIG. 6 is a schematic block diagram depicting a third variation of the system of FIG. 3.

FIG. 7 is a schematic block diagram depicting the DMU of FIG. 3 in greater detail.

DETAILED DESCRIPTION

Figure 1:
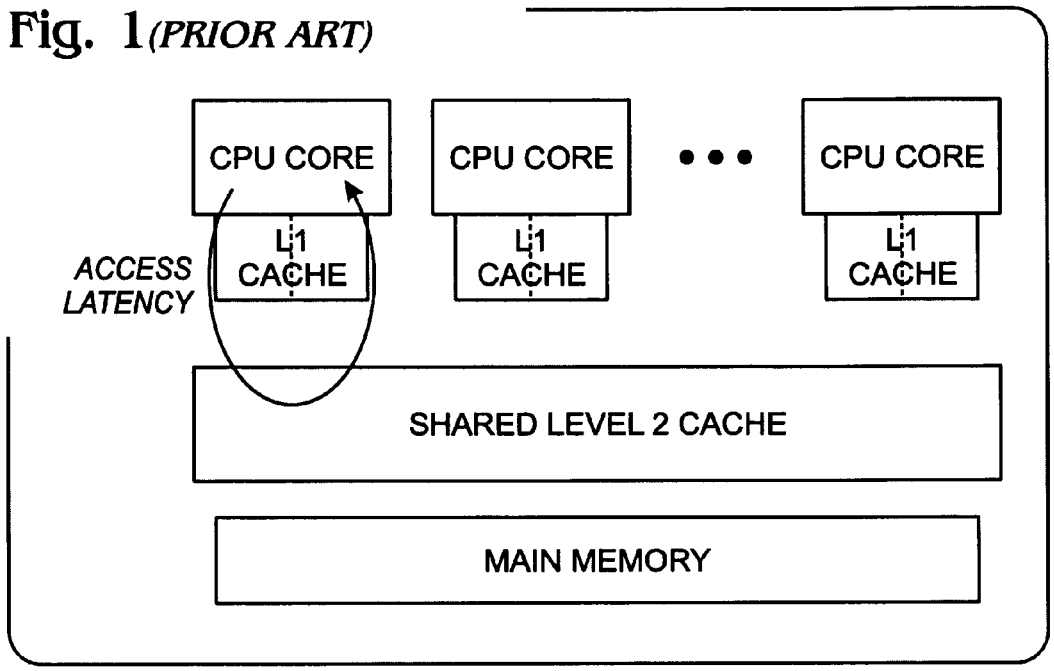
FIG. 1 is a schematic diagram depicting a plurality of processors sharing an L2 cache and main memory (prior art).
Figure 2:
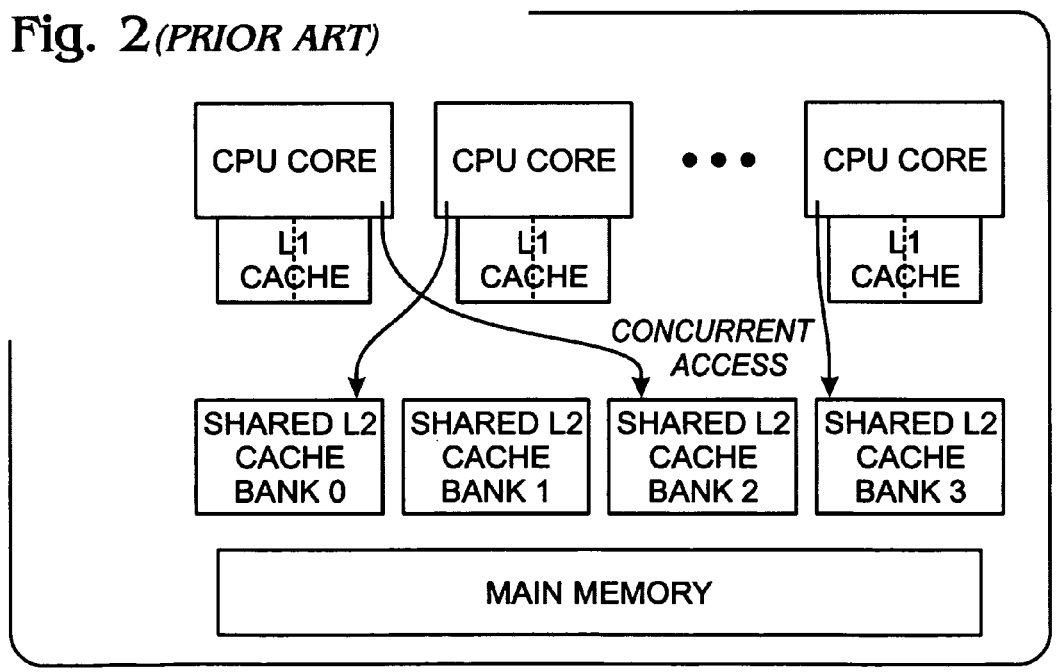
FIG. 2 is a schematic diagram of a multi-processor system using an L2 cache bank (prior art).
Figure 3:
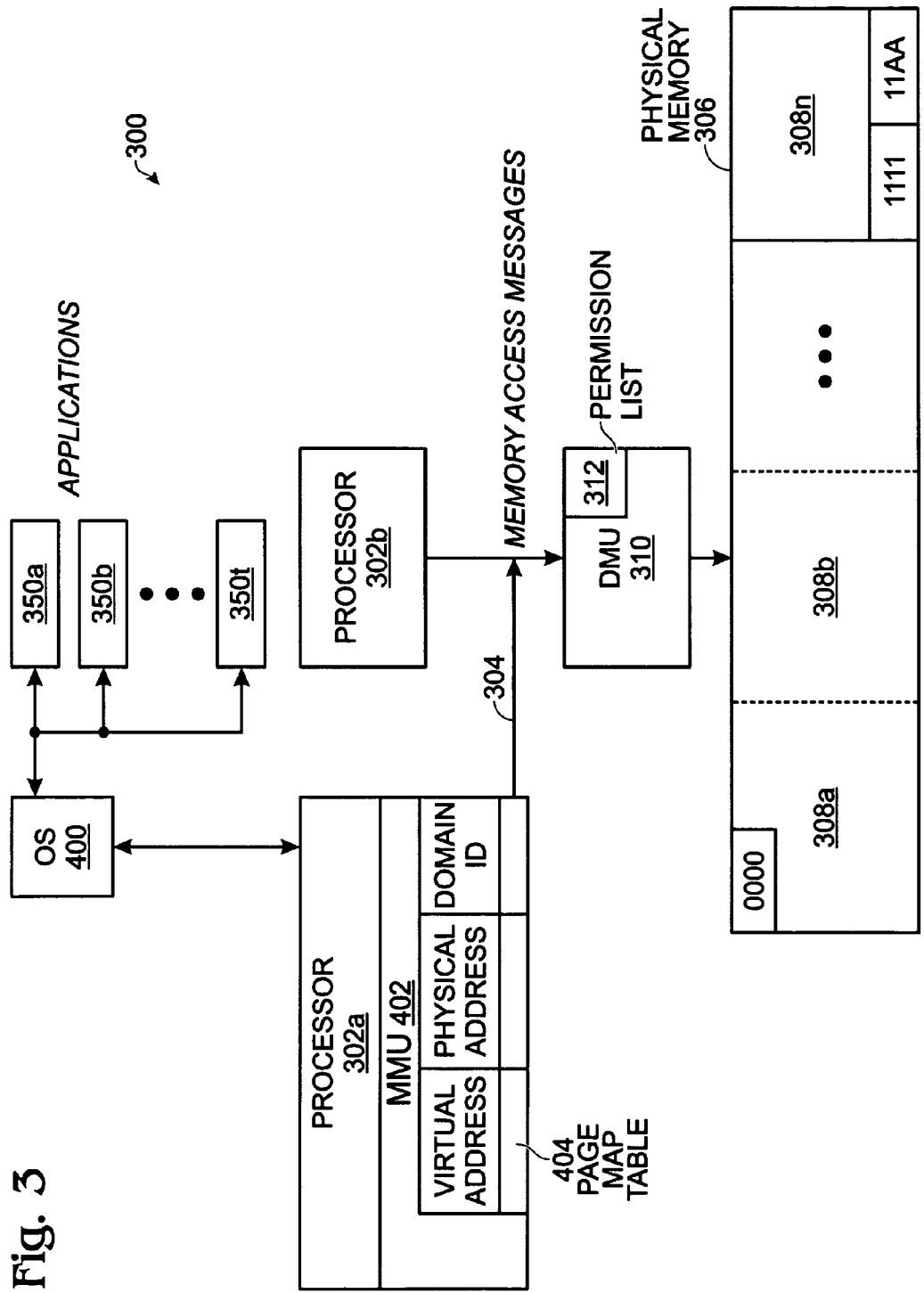
FIG. 3 is a schematic block diagram of a multi-processor computer system for managing physical memory domains.

FIG. 3 is a schematic block diagram of a multi-processor computer system for managing physical memory domains. As used herein, a heterogeneous multi-processor system uses different types of processors—having different functionality and programming models. That is, heterogeneous processors use different algorithms to translate between virtual addresses and (real) addresses in a physical memory. Homogeneous processors have the exact same functionality and programming model. The term asymmetric means that the system is running multiple operating systems that are essentially unaware of each other but sharing a common memory system.

The system 300 comprises a processor 302 having an address interface on line 304 for sending a memory access message including an address in physical memory and a domain identification (ID). A physical memory 306 is portioned into a plurality of domains, where each domain includes a plurality of physical addresses. Shown are domains 308a through 308n. In this example, n is a variable equal to 3, but the system is not limited to any particular number of domains.

A domain mapping unit (DMU) 310 has an interface on line 304 to accept the memory access message from the processor 302. The DMU 310 uses the domain ID to access a permission list 312, and cross-references the domain ID to a domain that includes addresses in physical memory 306. The DMU 310 grants the processor access to the address in response to the address being located in the domain. Typically, "access" involves either a read or write operation. As explained in more detail below, the memory access message may include information to define the type of access allowed.

For example, the processor 302 sends a memory access message with the address of "0000" and a domain ID of AA. The DMU cross-references domain ID AA to domain 308a, and notes that address "0000" is located in domain 308a. As a result, the processor is granted access to address "0000". In another example, the DMU 310 accepts a memory access message with an address in physical memory (e.g., "0000") and a domain ID (e.g., BB), and uses the domain ID to access the permission list, as described above. The DMU 310 fails to grant access to the address if the permission list does not locate the address in a domain (e.g., 308b) cross-referenced to the domain ID (BB).

As another example, the DMU 310 accepts a first memory access message from a first processor 302a, with a third address in physical memory and a third domain ID. Further, the DMU 310 accepts a second memory access message from a second processor 302b, with a second address in physical memory and a second domain ID. The DMU 310 uses the second and third domain IDs to access the permission list, and grants access to the second and third addresses, in response to the permission list locating the second and third addresses in a shared domain cross-referenced to the second and third domain IDs. For example, the second address may be "1111", the third address "11AA", the second domain ID ZZ, and the third domain ID XX. If the XX and ZZ domain IDs both cross-reference to domain 308n, and addresses "1111" and "11AA" are both located in domain 308n, then both the first and second processors are granted access to the requested addresses.

In one aspect, the system 300 includes an operating system (OS) enabled as computer readable code. For convenience, the OS is shown as a module, but it should be understood that an OS is a type of software application made up of instructions stored in a memory that are operated upon by a processor. These instructions may be referenced using virtual addressing, however, the OS instructions are actually stored in a physical memory. More explicitly, an OS is responsible for the management of software applications, the coordination of activities, and the sharing of computer resources. By using the OS as an interface to the hardware, an application is relieved of management details, making the applications easier to write. Applications access OS services through application programming interfaces (APIs) or system calls. By invoking these interfaces, the application can request a service from the operating system, pass parameters, and receive the results of the operation.

A memory management unit (MMU) 402 includes a page table map 404 of virtual memory addresses cross-referenced to addresses in the physical memory, and the domain ID associated with each address in physical memory. An MMU is a computer hardware component responsible for handling accesses to memory requested by a processor. For example, the MMU 402 may be embedded in a load store unit of a processor, which connector the processor to the memory system. An MMU typically divides the virtual address space into pages, each having a size which is a power of 2, usually a few kilobytes. The bottom n bits of the address (the offset within a page) are left unchanged. The upper address bits are the (virtual) page number. The MMU normally translates virtual page numbers to physical page numbers via an associative cache called a Translation Lookaside Buffer (TLB), which is also referred to as page table map 404. The data found in such a data structure is typically called a page table entry (PTEs), and the data structure itself is typically called a page table. The physical page number is typically combined with the page offset to give the complete physical address.

Each TLB entry typically carries descriptors that tell the system hardware how to treat memory accesses. Some example descriptors include address space cacheability, globally visibility, write through vs. write back, process number, and the allocation policy to be followed. Globally visible refers to an address space that is shared by other processors and associated caches, thus requiring a mechanism to maintain coherency. In addition to the table entry including the virtual page number and associated physical page number, the above-mentioned descriptors may be added as additional attribute bits related to a virtual or physical address.

More explicitly, additional attribute bits are added to the physical side of the PTEs, called domain bits. During typical operation, domain mappings are made during system initialization. Each OS is assigned to one or more domains and given those numbers (domain IDs). If multiple OSs coexist sharing the same physical address space, then the domain mechanism is used to make sure that one OS doesn't allocate or use a non-assigned physical address space.

During runtime, the OS or an application calculates and generates address pointers within their allocated virtual memory space. When a load or store instruction occurs, the virtual memory address lookup occurs in the processor's MMU. This lookup results returns the associated physical address and the additional attribute (domain) bits.

The DMU contains a list of associations between domain bits and address spaces. When a load or store operation is generated by a processor, the DMU uses the domain bits as a lookup to check whether the operation is allowed to the specific address that was generated. In this way multiple processors can share the same physical address map each running independent OSs, without fear of address map collisions.

In contrast, the current art for the performance of similar operations is enabled in virtual memory. This solution requires that additional bits be added to the virtual side of the address, which essentially expands the virtual address. This expanded virtual address requires the running of a top layer application called a Hypervisor. While this approach permits multiple OSs to coexist on the same processor core, the additional Hypervisor software layer requires extra processing steps. Further, the Hypervisor approach breaks down in a system using heterogeneous or asymmetric processors. The claimed invention's use of domains is enabled in hardware as the physical memory is accessed.

Thus, the OS 400 is assigned addresses in a physical memory domain at initialization, builds the page table map, and loads the page table map into the MMU 402. The DMU 310 builds the permission list cross-referencing domain IDs to domains at initialization.

In a different aspect, the system further includes at least one application 350 enabled as processor readable code. Shown are applications 350a through 350t, where t is an unlimited variable. For convenience, the applications are shown as modules, but it should be understood that an application or program is made up of instructions stored in a memory that are operated upon by a processor. The OS 400 allocates a unique portion of virtual memory to the application, and the MMU 402 includes a page table map of application addresses in virtual memory cross-referenced to addresses in the physical memory.

Figure 4:
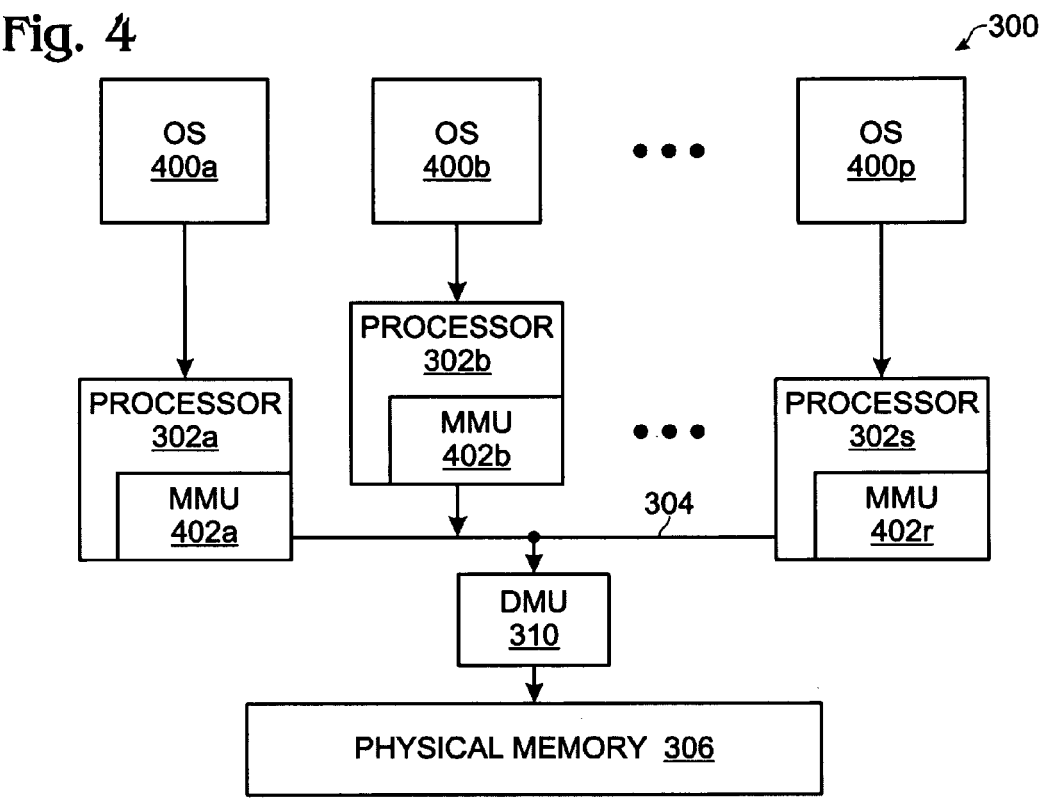
FIG. 4 is a schematic block diagram of a first variation of the system of FIG. 3.

FIG. 4 is a schematic block diagram of a first variation of the system of FIG. 3. A plurality of operating systems (OSs) 400 is enabled as computer readable code. Shown are OSs 400a through 400p, where p is a variable equal to 3 in this example. However, the system is not limited to any particular number of OSs. Also shown are a plurality of memory management units (MMUs) 402a through 402r, where r is a variable. Again, although r is equal to 3 in this example, the system is not limited to any particular value. Typically however, each MMU is associated with a particular processor, as shown. Each MMU 402 includes a page table map of virtual memory addresses cross-referenced to addresses in the physical memory, and the domain ID associated with each address in physical memory.

A plurality of processors 302a through 302s are shown, where s is an unlimited variable (in this example, equal to 3). Each processor 302 is associated with a corresponding OS and MMU. At least two of the processors are heterogeneous (e.g., processors 302a and 302b), having different MMU algorithms for associating virtual addresses to addresses in physical memory. For example, processor 302a may be a general purpose computer processing unit (CPU), while processor 302b is a data management application (DMA) engine. The CPU and the DMA engine have completely different memory management models. As another example, the processors may be an ARM processor and a PowerPC processor. However, the DMU 310 permits the physical memory to be accessed by the heterogeneous processors, without conflict or the possibility of cross-corruption.

Figure 5:
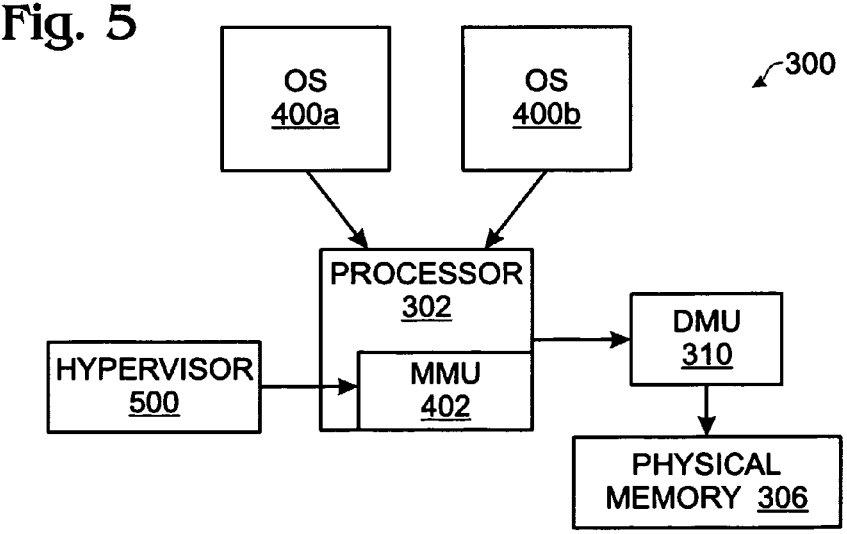
FIG. 5 is a schematic block diagram depicting a second variation of the system of FIG. 3.

FIG. 5 is a schematic block diagram depicting a second variation of the system of FIG. 3. In this aspect a processor 302 receives requests to access virtual memory addresses from the plurality of OSs (e.g., OSs 400a and 400b). The processor 302 accesses MMU 402 to recover cross-referenced addresses in physical memory 306 and associated domain IDs, and sends the addresses in physical memory and domain IDs to the DMU as memory access messages. Since there are two OSs working with the virtual addresses, a Hypervisor 500 may be used to manage the virtual addresses.

Returning to FIG. 4, the plurality of processors 302a through 302s may all be homogeneous processors. Each processor 302 is associated with a corresponding OS 400 and MMU 402. Each processor 302 receives a request to access virtual memory addresses from its corresponding OS 400, accesses its corresponding MMU 402 to recover cross-referenced addresses in physical memory and associated domain IDs, and sends the addresses in physical memory and domain IDs to the DMU 310 as memory access messages.

FIG. 6 is a schematic block diagram depicting a third variation of the system of FIG. 3. Shown are a plurality of OSs 400 enabled as processor readable code and a plurality of MMUs 402. As above, each MMU includes a map of virtual memory addresses cross-referenced to addresses in the physical memory, and the domain ID associated with each address in physical memory. A first subsystem 700 includes a plurality of symmetric processors 302a through 302n. A second subsystem 702 includes a plurality asymmetric processors 302o through 302z. Note: n and z are variables not limited to any particular value, and the number of symmetric processors need not equal the number of asymmetric processors. For simplicity, it is assumed that each processor is associated with one corresponding OS and MMU, however, it possible for an OS to be associated with more than one processor, and a processor may be associated with more than one OS.

Each processor from the first and second subsystems receives requests to access virtual memory locations from an OS, accesses an MMU to recover cross-referenced addresses in physical memory and associated domain IDs, and sends the addresses in physical memory and domain IDs to the DMU as memory access messages.

FIG. 7 is a schematic block diagram depicting the DMU of FIG. 3 in greater detail. In one aspect, the DMU accepts a memory access message with an address in physical memory, access type, and a domain ID. The DMU uses the domain ID to access the permission list, noting that address is located in the domain. However, the DMU fails to grant access to the address if the received access type does not match the permission type listed in the permission list.

The DMU may also use the domain ID as an index to access a permission list look-up table to discover the following types of information: the base address associated with an OS, an address range, permission types, and steering information. The DMU reads addresses in physical memory from the look-up table, compares the addresses from the look-up table to the address in the memory access message, and grants access to the physical memory in response to matching addresses.

Permissions would include making a space "read-only" vs. "write-only" vs. "read-write". So it is possible to set up a producer-consumer arrangement where one OS has only the rights to write data into a memory location, while another OS has only rights to read data from that same memory location. The domain programming controls such a privilege in the physical address map.

Steering information is used to determine what to do with the transaction based on the address and domain information. For example, if a transaction can be steered into multiple paths, steering information bits can be used to make that steering determination without requiring a full address decode.

Functional Description

Figure 8:
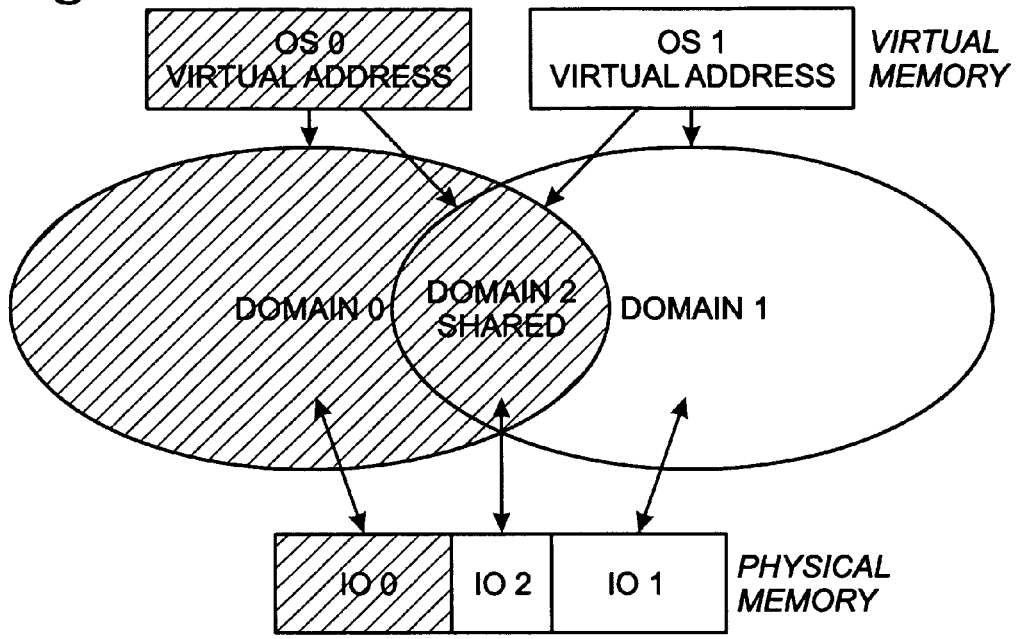
FIG. 8 is a diagram graphically depicting the relationship between virtual memory, domains, and physical memory.

FIG. 8 is a diagram graphically depicting the relationship between virtual memory, domains, and physical memory. OS 0 and OS 1 are two different virtual memory spaces. For example, these virtual memory spaces may be assigned to different OSs. OS 0 is associated with Domain 0, while OS 1 is associated with Domain 1. Domain 0 is associated with addresses IO 0 in physical memory, and Domain 1 is associated with addresses in IO 1. Both OS 0 and OS 1 are associated with a shared domain, Domain 2, which is associated with addresses in IO 2 of the physical memory.

Figure 9:
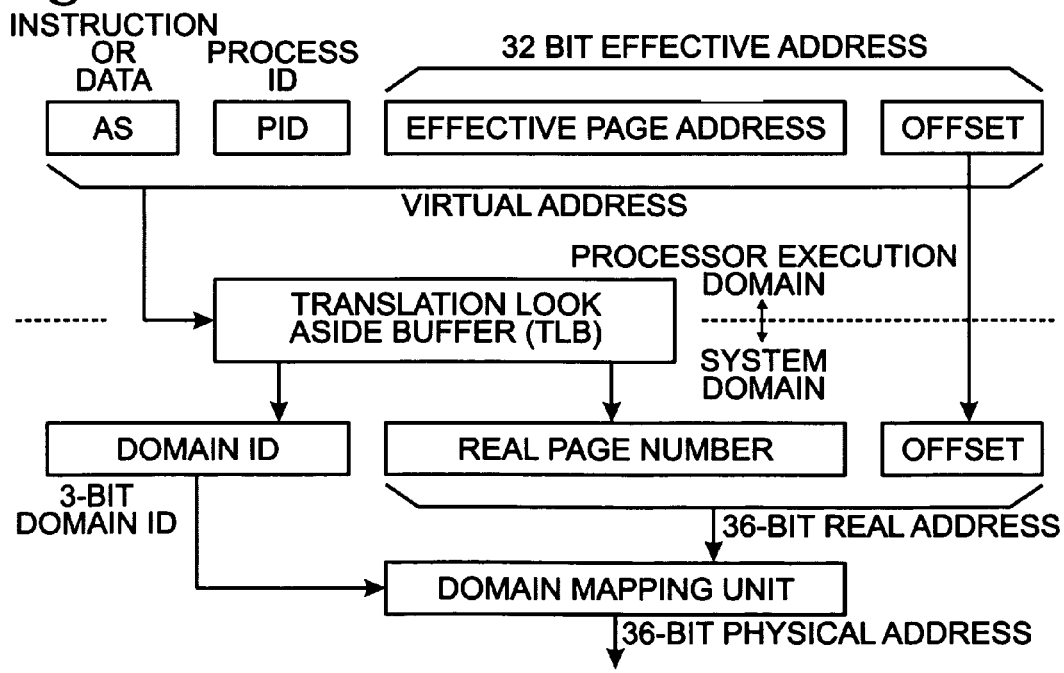
FIG. 9 is a diagram depicting address translation using a domain ID.

FIG. 9 is a diagram depicting address translation using a domain ID. This figure represents an MMU operation for translating a virtual address into an address in physical memory. As shown, the DMU uses the domain ID to gate the received physical (real) addresses.

Figure 10:
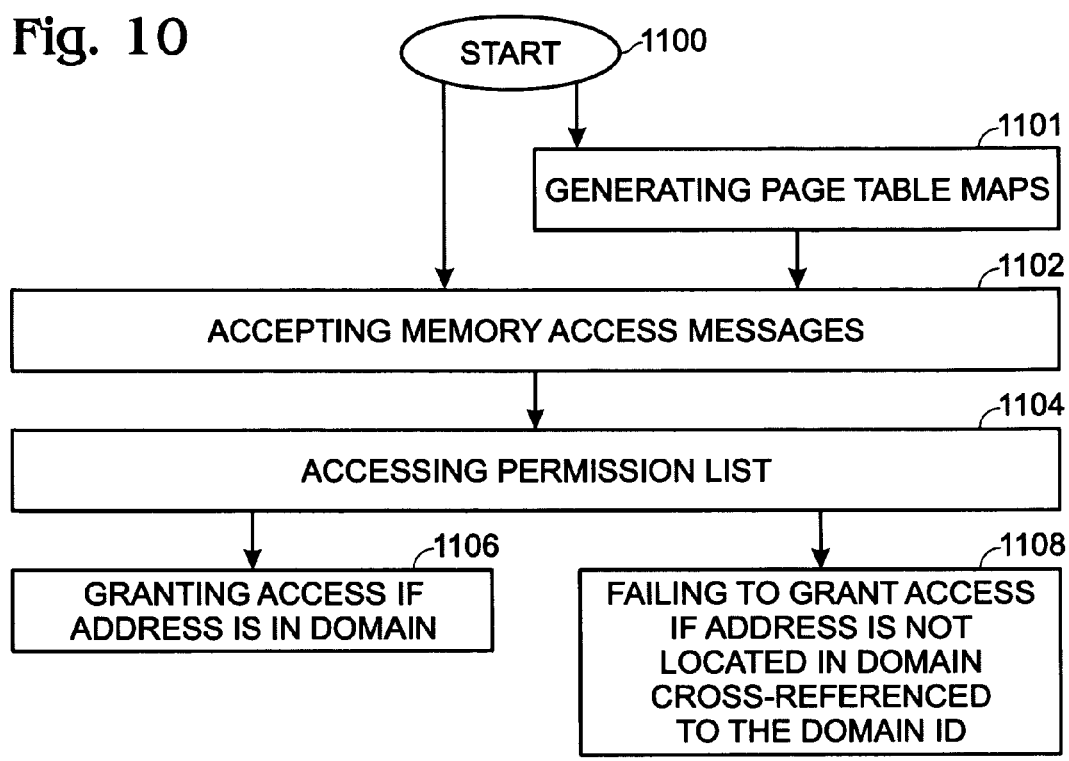
FIG. 10 is a flowchart illustrating a method for managing physical memory domains in a multi-processor computer system.

FIG. 10 is a flowchart illustrating a method for managing physical memory domains in a multi-processor computer system. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1100.

At a DMU, Step 1102 accepts a memory access message, including an address in physical memory and a domain identification (ID), from a processor. Step 1104 accesses a permission list cross-referencing domain IDs to domains of addresses in physical memory. In Step 1106 the DMU grants the processor access to the address in physical memory, in response to the address being located in the domain. Alternately, in Step 1108, the DMU fails to grant access to the address in physical memory if the permission list does not locate the address in a domain cross-referenced to the domain ID.

In one aspect, accepting the memory access message in Step 1102 includes accepting a first memory access message from a first processor, with a first address in physical memory and a first domain ID. Further, Step 1102 accesses a second memory access message from a second processor, with a second address in physical memory and a second domain ID. Accessing the permission list in Step 1104 includes the DMU using the first and second domain IDs to access the permission list. Then, granting the processor access to the address in physical memory in Step 1106 includes granting access to the first and second addresses, in response to the permission list locating the first and second addresses in a shared domain cross-referenced to the first and second domain IDs.

In another aspect, Step 1101 generates a plurality of page table maps of virtual memory addresses cross-referenced to addresses in the physical memory, and the domain ID associated with each address in physical memory. Step 1102 accepts memory access messages from a corresponding plurality of processors, including at least two heterogeneous processors having different MMU algorithms for associating virtual addresses to addresses in physical memory. Step 1106 grants the heterogeneous processors access to the addresses in physical memory, in response to addresses being located in corresponding domains. Alternately, Step 1102 accepts memory access messages from homogeneous processors, and access by the homogeneous processors is granted in Step 1106, in response to addresses being located in corresponding domains.

In another variation, Step 1102 accepts a plurality of memory access messages from a processor, each memory access message associated with a corresponding OS. Then, Step 1106 grants access to the memory access messages associated with each OS, in response to addresses being located in corresponding domains. If Step 1102 accepts memory access messages from a first subsystem including a plurality of symmetric processors and a second subsystem including a plurality asymmetric processors, Step 1106 grants access to the processors in the first and second subsystems, in response to addresses being located in corresponding domains.

In one aspect, accessing the permission list in Step 1104 includes using the domain ID as an index to access a permission list look-up table including the base address associated with an OS, an address range, permission types, and steering information. Then, granting access to the address in physical memory in Step 1106 includes the DMU reading addresses in physical memory from the look-up table, comparing the addresses from the look-up table to the address in the memory access message, and granting access to the physical memory in response to matching addresses.

In another aspect, Step 1102 accepts a memory access message including an access type. Then, failing to grant access to the address in physical memory in Step 1108 includes failing to grant access to the address if the received access type does not match the permission type listed in the permission list.

A system and method have been provided for managing physical memory domains in a multi-processor computer system. Examples of particular message structures, processor, and hardware units have been presented to illustrate the invention. However, the invention is not limited to merely these examples. Other variations and embodiments of the invention will occur to those skilled in the art.

I claim:

1. A multi-processor computer system for managing physical memory domains, the system comprising:
 a processor having an address interface for sending a memory access message including an address in physical memory and a domain identification (ID);
 a physical memory portioned into a plurality of domains, where each domain includes a plurality of physical addresses;
 a domain mapping unit (DMU) having an interface to accept the memory access message from the processor, the DMU using the domain ID to access a permission list, cross-reference the domain ID to a domain including addresses in physical memory, and grant the processor access to the address in response to the address being located in the domain; and,
 wherein the DMU accents a first memory access message from a first processor, with a first address in physical memory and a first domain ID. and a second memory access message from a second processor, with a second address in physical memory and a second domain ID, the DMU using the first and second domain IDs to access the permission list, and granting access to the first and second addresses in response to the permission list locating the first and second addresses in a shared domain cross-referenced to the first and second domain IDs.

2. The system of claim 1 wherein the DMU accepts a memory access message with an address in physical memory and a domain ID, uses the domain ID to access the permission list, and fails to grant access to the address if the permission list does not locate the address in a domain cross-referenced to the domain ID.

3. The system of claim 1 further comprising:
a plurality of operating systems (OSs) enabled as computer readable code;
a plurality of memory management units (MMUs), each MMU including a page table map of virtual memory addresses cross-referenced to addresses in the physical memory, and the domain ID associated with each address in physical memory;
a plurality of processors, each processor associated with a corresponding OS and MMU, including at least two heterogeneous processors having different MMU algorithms for associating virtual addresses to addresses in physical memory; and,
wherein the physical memory is accessed, via the DMU, by the heterogeneous processors.

4. The system of claim 1 further comprising:
a plurality of OSs enabled as computer readable code;
a memory management unit (MMU) including a page table map of virtual addresses cross-referenced to addresses in the physical memory, and the domain ID associated with each address in physical memory; and,
wherein the processor receives requests to access virtual memory addresses from the plurality of OSs, accesses the MMU to recover cross-referenced addresses in physical memory and associated domain IDs, and sends the addresses in physical memory and domain IDs to the DMU as memory access messages.

5. The system of claim 4 further comprising:
a plurality of MMUs;
a plurality of homogeneous processors, each processor associated with a corresponding OS and MMU, wherein each processor receives a request to access virtual memory addresses from its corresponding OS, accesses its corresponding MMU to recover cross-referenced addresses in physical memory and associated domain IDs, and sends the addresses inn physical memory and domain IDs to the DMU as memory access messages.

6. The system of claim 1 further comprising:
an OS enabled as computer readable code;
a memory management unit (MMU) including a page table map of virtual memory addresses cross-referenced to addresses in the physical memory, and the domain ID associated with each address in physical memory; and,
wherein the OS is assigned addresses in a physical memory domain at initialization, builds the page table map, and loads the page table map into the MMU; and,
wherein the DMU builds the permission list cross-referencing domain IDs to domains at initialization.

7. The system of claim 1 further comprising:
an OS enabled as processor readable code;
a memory management unit (MMU) including a map of virtual memory addresses cross-referenced to addresses in the physical memory, and the domain ID associated with each address in physical memory;
an application enabled as processor readable code;
wherein the OS allocates a unique portion of virtual memory to the application; and,
wherein the MMU includes a page table map of application addresses in virtual memory cross-referenced to addresses in the physical memory.

8. The system of claim 1 wherein the DMU uses the domain ID as an index to access a permission list look-up table including the base address associated with an OS, an address range, permission types, and steering information, the DMU reading addresses in physical memory from the look-up table, comparing the addresses from the look-up table to the address in the memory access message, and granting access to the physical memory in response to matching addresses.

9. The system of claim 1 further comprising:
a plurality of OSs enabled as processor readable code;
a plurality of memory management units MMUs), each MMU including a map of virtual memory addresses cross-referenced to addresses in the physical memory, and the domain ID) associated with each address in physical memory;
a first subsystem including a plurality of symmetric processors;
a second subsystem including a plurality of asymmetric processors;
wherein each processor from the first and second subsystems receives requests to access virtual memory locations from an OS, accesses an MMU to recover cross-referenced addresses in physical memory and associated domain IDs, and sends the addresses in physical memory and domain IDs to the DMU as memory access messages.

10. The system of claim 1 wherein the DMU accepts a memory access message with an address in physical memory, access type, and a domain ID, the DMU using the domain ID to access the permission list, noting that the address is located in the domain, but failing to grant access to the address if the received access type does not match the permission type listed in the permission list.

11. A multi-processor computer system for managing physical memory domains, the system comprising:
a physical memory portioned into a plurality of domains, where each domain includes a plurality of physical addresses;
a plurality of operating systems (OSs) enabled as computer readable code;
a plurality of memory management units (MMUs), each MMU including a page table map of virtual memory addresses cross-referenced to addresses in the physical memory, and a domain ID associated with each address in physical memory;
a plurality of processors, each associated with a corresponding OS and MMU, and each having an address interface for sending a memory access message including an address in physical memory and a domain identification (ID), the plurality of processors including at least two heterogeneous processors having different MMU algorithms for associating virtual addresses to addresses in physical memory;
a domain mapping unit (DMU) having an interface to accept the memory access message from each processor, the DMU using the domain ID to access a permission list, cross-reference the domain ID to a domain including addresses in physical memory, and grant the processors access to the address in response to the address being located in the domain; and,
wherein the physical memory is accessed, via the DMU, by the heterogeneous processors.

12. A multi-processor computer system for managing physical memory domains, the system comprising:

a plurality of OSs enabled as computer readable code;
a memory management unit (MMU) including a page table map of virtual addresses cross-referenced to addresses in the physical memory, and a domain ID associated with each address in physical memory;
a processor having an address interface for sending a memory access message including an address in physical memory and a domain identification (ID);
a physical memory portioned into a plurality of domains, where each domain includes a plurality of physical addresses;
a domain mapping unit (DMU) having an interface to accept the memory access message from the processor, the DMU using the domain ID to access a permission list, cross-reference the domain ID to a domain including addresses in physical memory, and grant the processor access to the address in response to the address being located in the domain; and,
wherein the processor receives requests to access virtual memory addresses from the plurality of OSs, accesses the MMU to recover cross-referenced addresses in physical memory and associated domain IDs, and sends the addresses in physical memory and domain IDs to the DMU as memory access messages.

13. The system of claim 12 further comprising:
a plurality of MMUs;
a plurality of homogeneous processors, each processor associated with a corresponding OS and MMU, wherein each processor receives a request to access virtual memory addresses from its corresponding OS, accesses its corresponding MMU to recover cross-referenced addresses in physical memory and associated domain IDs, and sends the addresses in physical memory and domain IDs to the DMU as memory access messages.

14. A multi-processor computer system for managing physical memory domains, the system comprising:
a processor having an address interface for sending a memory access message including an address in physical memory and a domain identification (ID);
a physical memory portioned into a plurality of domains, where each domain includes a plurality of physical addresses; and,
a domain mapping unit (DMU) having an interface to accept the memory access message from the processor, the DMU using the domain ID to access a permission list, cross-reference the domain ID to a domain including addresses in physical memory, and grant the processor access to the address in response to the address being located in the domain;
a memory management unit (MMU) including a map of virtual memory addresses cross-referenced to addresses in the physical memory, and the domain ID associated with each address in physical memory;
an OS enabled as processor readable code;
an application enabled as processor readable code;
wherein the OS allocates a unique portion of virtual memory to the application; and,
wherein the MMU includes a page table map of application addresses in virtual memory cross-referenced to addresses in the physical memory.

15. A multi-processor computer system for managing physical memory domains, the system comprising:
a processor having an address interface for sending a memory access message including an address in physical memory and a domain identification (ID);
a physical memory portioned into a plurality of domains, where each domain includes a plurality of physical addresses;
a domain mapping unit (DMU) having an interface to accept the memory access message from the processor, the DMU using the domain ID to access a permission list, cross-reference the domain ID to a domain including addresses in physical memory, and grant the processor access to the address in response to the address being located in the domain; and,
wherein the DMU uses the domain ID as an index to access a permission list look-up table including the base address associated with an OS, an address range, permission types, and steering information, the DMU reading addresses in physical memory from the look-up table, comparing the addresses from the look-up table to the address in the memory access message, and granting access to the physical memory in response to matching addresses.

16. A multi-processor computer system for managing physical memory domains, the system comprising:
a processor having an address interface for sending a memory access message including an address in physical memory and a domain identification (ID);
a physical memory portioned into a plurality of domains, where each omain includes a plurality of physical addresses;
a domain mapping unit (DMU) having an interface to accept the memory access message from the processor, the DMU using the domain ID to access a permission list, cross-reference the domain ID to a domain including addresses in physical memory, and grant the processor access to the address in response to the address being located in the domain;
an OS enabled as computer readable code;
a memory management unit (MMU) including a page table map of virtual memory addresses cross-referenced to addresses in the physical memory, and the domain ID associated with each address in physical memory;
wherein the OS is assigned addresses in a physical memory domain at initialization, builds the page table map, and loads the page table map into the MMU; and,
wherein the DMU builds the permission list cross-referencing domain IDs to domains at initialization.

17. A multi-processor computer system for managing physical memory domains, the system comprising:
a plurality of processors, each having an address interface for sending a memory access message including an address in physical memory and a domain identification (ID);
a physical memory portioned into a plurality of domains, where each omain includes a plurality of physical addresses;
a domain mapping unit (DMU) having an interface to accept the memory access message from the processors, the DMU using the domain ID to access a permission list, cross-reference the domain ID to a domain including addresses in physical memory, and grant the processors access to the address in response to the address being located in the domain; and,
a plurality of OSs enabled as processor readable code;
a plurality of memory management units (MMUs), each MMU including a map of virtual memory addresses cross-referenced to addresses in the physical memory, and the domain ID associated with each address in physical memory;

a first subsystem including a plurality of symmetric processors;

a second subsystem including a plurality of asymmetric processors;

wherein each processor from the first and second subsystems receives requests to access virtual memory locations from an OS, accesses an MMU to recover cross-referenced addresses in physical memory and associated domain IDs, and sends the addresses in physical memory and domain IDs to the DMU as memory access messages.

* * * * *

UNITED STATES PATENT AND TRADEMARK OFFICE
CERTIFICATE OF CORRECTION

| | | |
|---|---|---|
| PATENT NO. | : 8,190,839 B2 | Page 1 of 1 |
| APPLICATION NO. | : 12/402345 | |
| DATED | : May 29, 2012 | |
| INVENTOR(S) | : Daniel Bouvier | |

It is certified that error appears in the above-identified patent and that said Letters Patent is hereby corrected as shown below:

In Claim 1, column 10, line 61, the word "accepts" has been incorrectly printed as "accents".

In Claim 5, column 11, line 46, the word "in" has been incorrectly printed as "inn".

In Claim 9, column 12, line 17, the abbreviation "ID" has been incorrectly printed as "ID)".

In Claim 16, column 14, line 27, the word "domain" has been incorrectly printed as "omain".

In Claim 17, column 14, line 53, the word "domain" has been incorrectly printed as "omain".

Signed and Sealed this
Twenty-fourth Day of July, 2012

David J. Kappos
*Director of the United States Patent and Trademark Office*